United States Patent
Rite (10) Patent No.: US 12,092,354 B1
(45) Date of Patent: *Sep. 17, 2024

(54) SYSTEMS AND METHODS FOR DETECTING AIR FILTER FOULING IN A CLIMATE CONTROL SYSTEM

(71) Applicant: Trane International Inc., Davidson, NC (US)

(72) Inventor: Raymond Walter Rite, Tyler, TX (US)

(73) Assignee: Trane International Inc., Davidson, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/059,760

(22) Filed: Nov. 29, 2022

Related U.S. Application Data (63) Continuation of application No. 16/666,037, filed on Oct. 28, 2019, now Pat. No. 11,543,147.

(51) Int. Cl.
*B01D 46/00* (2022.01)
*B01D 46/44* (2006.01)
*F24F 11/39* (2018.01)
*F24F 11/74* (2018.01)

(52) U.S. Cl.
CPC ........ *F24F 11/745* (2018.01); *B01D 46/0086* (2013.01); *B01D 46/446* (2013.01); *F24F 11/39* (2018.01)

(58) Field of Classification Search
CPC ...... B01D 46/42; B01D 46/46; B01D 46/444; B01D 46/446; B01D 46/2403; B01D 46/0086; G06F 17/00; F24F 11/39; F24F 11/745

USPC ............................ 55/385.1, DIG. 34; 96/424
See application file for complete search history.

(56) References Cited

U.S. PATENT DOCUMENTS

| | | | |
|---|---|---|---|
| 2,983,213 A | 5/1961 | Bohanon | |
| 4,751,501 A | 6/1988 | Gut | |
| 5,779,769 A | 7/1998 | Jiang | |
| 6,080,060 A | 6/2000 | Larsson | |
| 6,217,439 B1 | 4/2001 | Janeling et al. | |
| 6,660,070 B2 * | 12/2003 | Chung ................ | B01D 46/442 96/417 |
| 7,270,691 B2 | 9/2007 | Arts et al. | |
| 7,640,077 B2 | 12/2009 | Shah | |
| 7,789,820 B2 | 9/2010 | Akers et al. | |
| 7,833,305 B1 | 11/2010 | Studer | |

(Continued)

*Primary Examiner* — Minh Chau T Pham
(74) *Attorney, Agent, or Firm* — WOMBLE BOND DICKINSON (US) LLP (57) ABSTRACT

Methods and related systems for operating a climate control system for an indoor space are disclosed. In an embodiment, the method includes increasing a speed of a fan of the climate control system, and determining a first fitted external static pressure (ESP) function from a first plurality of airflow values and a first plurality of ESP values. Additionally, the method includes obtaining a baseline ESP from the first fitted ESP function, and determining a second fitted ESP function from a second plurality of airflow values and a second plurality of ESP values collected at least one week after the first plurality of airflow values and the first plurality of ESP values are collected. Further, the method includes comparing the first calculated ESP obtained from the second fitted ESP function to the baseline ESP to determine a condition of an air filter of the climate control system.

20 Claims, 4 Drawing Sheets

(56) References Cited

U.S. PATENT DOCUMENTS

| | | |
|---|---|---|
| 8,034,170 B2 | 10/2011 | Kates |
| 8,704,672 B2 | 4/2014 | Hoglund et al. |
| 9,823,169 B1 | 11/2017 | Witt, III et al. |
| 10,188,976 B2 * | 1/2019 | Cho .................... B01D 46/444 |
| 10,695,706 B2 | 6/2020 | Cho et al. |
| 11,543,147 B1 * | 1/2023 | Rite ........................ F24F 11/49 |
| 2004/0113803 A1 | 6/2004 | Keown |
| 2012/0318135 A1 | 12/2012 | Hoglund et al. |
| 2012/0323375 A1 | 12/2012 | Dead-Hendricks et al. |
| 2014/0216257 A1 | 8/2014 | Knowles |
| 2015/0330861 A1 | 11/2015 | Alsaleem |
| 2016/0045854 A1 | 2/2016 | Hung et al. |

\* cited by examiner

SYSTEMS AND METHODS FOR DETECTING AIR FILTER FOULING IN A CLIMATE CONTROL SYSTEM

CROSS-REFERENCE TO RELATED APPLICATIONS

This application is a continuation of U.S. patent application Ser. No. 16/666,037, filed Oct. 28, 2019, now U.S. Pat. No. 11,543,147 B1, entitled Systems and Methods for Detecting Air Filter Fouling in a Climate Control System, the content of which is incorporated herein by reference in its entirety.

STATEMENT REGARDING FEDERALLY SPONSORED RESEARCH OR DEVELOPMENT

Not applicable.

BACKGROUND

Climate control systems, such as heating, ventilation, and/or air conditioning (HVAC) systems may generally be used in residential and/or commercial areas for heating and/or cooling to create comfortable temperatures inside those areas. Some climate control systems may be split-type heat pump systems. These systems typically have an indoor air handling unit and an outdoor unit, which are capable of cooling a comfort zone by operating in a cooling mode for transferring heat from a comfort zone to an ambient zone using a refrigeration cycle. These systems are also generally capable of reversing the direction of refrigerant flow through the components of the climate control system so that heat is transferred from the ambient zone to the comfort zone, thereby heating the comfort zone. Climate control systems often include an air filer or cleaner to capture particulates and other contaminates. These particulates and other contaminates gradually accumulate on the air filter or cleaner of the climate control system during the operation of the climate control system, leading to the eventual "fouling" or clogging of the air filter. A fouled air filter may result in a substantially high external static pressure (ESP) across an air circulation path of the climate control system, including across the air filter, reducing the effectiveness of the climate control system and increasing a power usage of a motor of the climate control system needed to overcome the increased ESP.

BRIEF SUMMARY

Some embodiments disclosed herein are directed to a method of operating a climate control system for an indoor space. In an embodiment, the method includes increasing, from idle, a speed of an indoor fan of the climate control system to increase an airflow through the indoor space, and determining a first fitted external static pressure (ESP) function from a first plurality of airflow values and a first plurality of ESP values. In addition, the method includes obtaining a baseline ESP value of the climate control system from the first fitted ESP function, and determining a second fitted ESP function from a second plurality of airflow values and a second plurality of ESP values collected at least one week after the first plurality of airflow values and the first plurality of ESP values are collected. Further, the method includes obtaining a first calculated ESP value of the climate control system from the second fitted ESP function, and comparing the first calculated ESP value to the baseline ESP value to determine a condition of an air filter of the climate control system.

Other embodiments disclosed herein are directed to a climate control system for an indoor space. In an embodiment, the climate control system includes an indoor fan configured to produce an airflow through the indoor space, and an air filter configured to filter contaminants in the airflow produced by the indoor fan. In addition, the climate control system includes a controller to be coupled to the indoor fan. The controller is configured to increase, from idle, a speed of the indoor fan of the climate control system to increase the airflow through the indoor space, and determine a first fitted external static pressure (ESP) function from a first plurality of airflow values and a first plurality of ESP values. In addition, the controller is configured to obtain a baseline ESP value of the climate control system from the first fitted ESP function, and determine a second fitted ESP function from a second plurality of airflow values and a second plurality of ESP values collected by the controller at least one week after the first plurality of airflow values and the first plurality of ESP values are collected by the controller. Further, the controller is configured to obtain a first calculated ESP value of the climate control system from the second fitted ESP function, and compare the first calculated ESP value to the baseline ESP value to determine a condition of the air filter of the climate control system.

Still other embodiments disclosed herein are directed to a non-transitory machine-readable medium including instructions that, when executed by a processor, cause the processor to increase, from idle, a speed of an indoor fan of the climate control system to increase an airflow through the indoor space, and determine a first fitted external static pressure (ESP) function from a first plurality of airflow values and a first plurality of ESP values. In addition, the instructions, when executed by a processor, cause the processor to obtain a baseline ESP value of the climate control system from the first fitted ESP function, and determine a second fitted ESP function from a second plurality of airflow values and a second plurality of ESP values collected by the controller at least one week after the first plurality of airflow values and the first plurality of ESP values are collected by the controller. Further, the instructions, when executed by a processor, cause the processor to obtain a first calculated ESP value of the climate control system from the second fitted ESP value, and compare the first calculated ESP value to the baseline ESP value to determine a condition of an air filter of the climate control system.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about," "generally," "substantially," "approximately," and the like mean within a range of plus or minus 10%.

As previously described, particulates and other contaminates gradually accumulate on an air filter or cleaner of the climate control system during the operation of the climate control system, leading to the eventual "fouling" of the air filter that may reduce the effectiveness of the filter for removing contaminants from an air circulation path of the climate control system and increase a power usage of a motor of the climate control system in order to overcome an increased ESP (air flow restriction) across an air circulation path of the climate control system, including across the fouled or clogged air filter. Some climate control systems may be configured to provide a periodic alert to a user of the climate control system to replace the air filter, where the duration between the periodic alert is a fixed interval. In other climate control systems, a run time of a fan of the climate control system may be tracked by a controller of the climate control system and an alert may be provided to the user once a threshold run time for the fan has been exceeded. However, neither the fixed interval and fan tracking methods are capable of detecting fouling of the air filter, and thus, the alert provided to the user of the climate control system by these methods may be too soon—before the air filter has fouled—or too late—a substantial duration of time after the filter has fouled. Accordingly, embodiments disclosed herein include systems and methods for detecting fouling or clogging of an air filter of a climate control system. As will be described in more detail below, use of the embodiments disclosed herein may allow a climate control system to accurately and timely generate an alert to a user of the control system to change the air filter.

Figure 1:
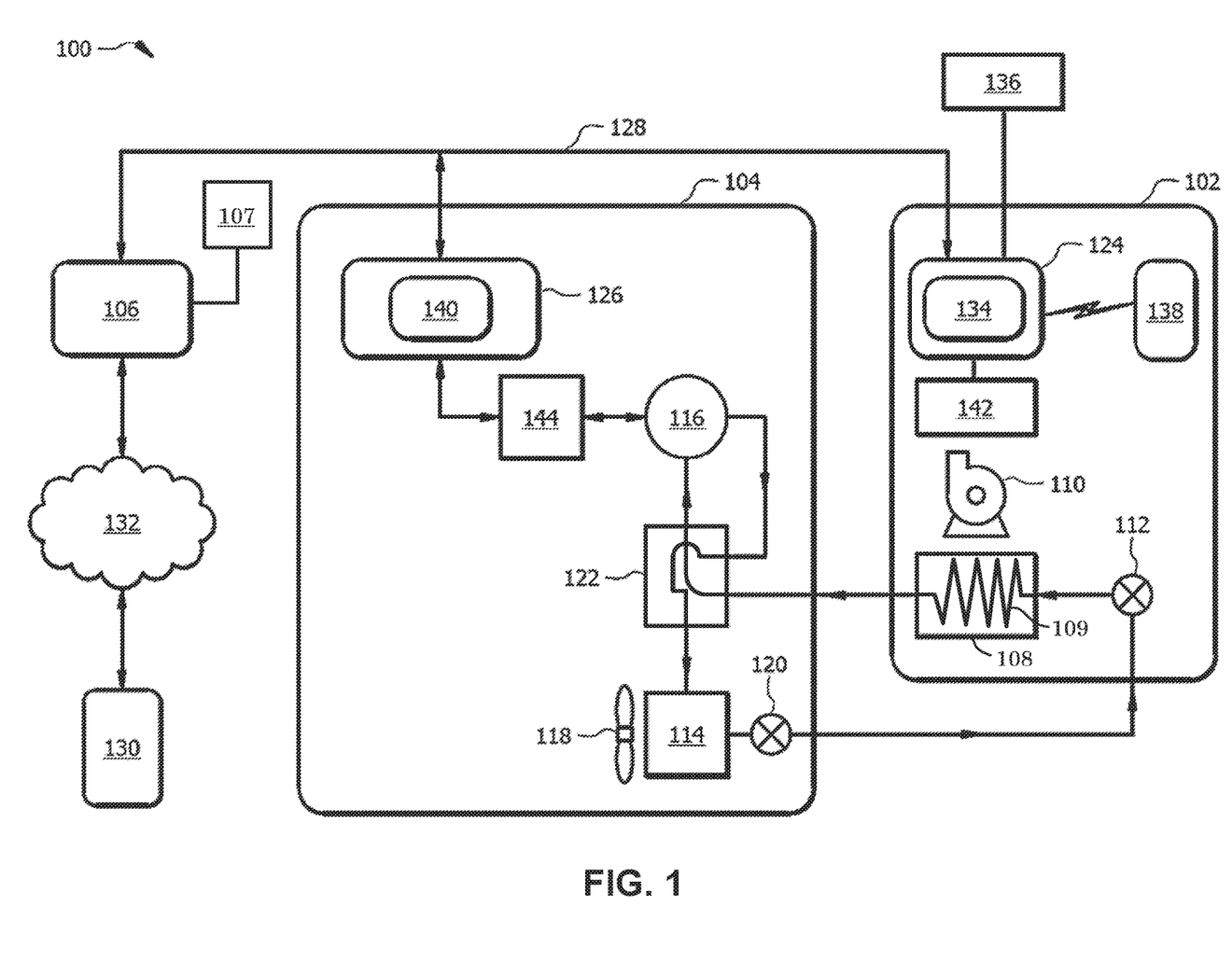
FIG. 1 is a diagram of a HVAC system configured for operating in a cooling mode according to some embodiments.

Referring now to FIG. 1, a schematic diagram of a climate control system 100 according to some embodiments is shown. In this embodiment, climate control system 100 is a HVAC system, and thus, system 100 may be referred to herein as HVAC system 100. Most generally, HVAC system 100 comprises a heat pump system that may be selectively operated to implement one or more substantially closed thermodynamic refrigeration cycles to provide a cooling functionality (hereinafter "cooling mode"), a heating functionality (hereinafter "heating mode"), and/or an air circulation functionality (hereinafter "fan only mode"). The HVAC system 100, configured as a heat pump system, generally comprises an indoor unit 102, an outdoor unit 104, and a system controller 106 that may generally control operation of the indoor unit 102 and/or the outdoor unit 104.

Indoor unit 102 generally comprises an indoor air handling unit comprising an indoor heat exchanger 108, an indoor fan 110, an indoor metering device 112, and an indoor controller 124. The indoor heat exchanger 108 may generally be configured to promote heat exchange between refrigerant carried within internal tubing of the indoor heat exchanger 108 and an airflow that may contact the indoor heat exchanger 108 but that is segregated from the refrigerant. Specifically, indoor heat exchanger 108 may include a coil 109 for channeling the refrigerant therethrough that segregates the refrigerant from any air flowing through indoor heat exchanger 108 during operations. In some embodiments, the indoor heat exchanger 108 may comprise a plate-fin heat exchanger. However, in other embodiments, indoor heat exchanger 108 may comprise a microchannel heat exchanger and/or any other suitable type of heat exchanger.

The indoor fan 110 may generally comprise a centrifugal blower comprising a blower housing, a blower impeller at least partially disposed within the blower housing, and a blower motor configured to selectively rotate the blower impeller. The indoor fan 110 may generally be configured to provide airflow through the indoor unit 102 and/or the indoor heat exchanger 108 (specifically across or over the coil 109) to promote heat transfer between the airflow and a refrigerant flowing through the coil 109 of the indoor heat exchanger 108. The indoor fan 110 may also be configured to deliver temperature-conditioned air from the indoor unit 102 to one or more areas and/or zones of an indoor space. The indoor fan 110 may generally comprise a mixed-flow fan and/or any other suitable type of fan. The indoor fan 110 may generally be configured as a modulating and/or variable speed fan capable of being operated at many speeds over one or more ranges of speeds. In other embodiments, the indoor fan 110 may be configured as a multiple speed fan capable of being operated at a plurality of operating speeds by selectively electrically powering different ones of multiple electromagnetic windings of a motor of the indoor fan 110.

The indoor metering device 112 may generally comprise an electronically-controlled motor-driven electronic expansion valve (EEV). In some embodiments, however, the indoor metering device 112 may comprise a thermostatic expansion valve, a capillary tube assembly, and/or any other suitable metering device. In some embodiments, while the indoor metering device 112 may be configured to meter the volume and/or flow rate of refrigerant through the indoor metering device 112, the indoor metering device 112 may also comprise and/or be associated with a refrigerant check valve and/or refrigerant bypass configuration when the direction of refrigerant flow through the indoor metering device 112 is such that the indoor metering device 112 is not intended to meter or otherwise substantially restrict flow of the refrigerant through the indoor metering device 112.

Outdoor unit 104 generally comprises an outdoor heat exchanger 114, a compressor 116, an outdoor fan 118, an outdoor metering device 120, a reversing valve 122, and an outdoor controller 126. In some embodiments, the outdoor unit 104 may also comprise a plurality of temperature sensors for measuring the temperature of the outdoor heat exchanger 114, the compressor 116, and/or the outdoor ambient temperature. The outdoor heat exchanger 114 may generally be configured to promote heat transfer between a refrigerant carried within internal passages of the outdoor heat exchanger 114 and an airflow that contacts the outdoor heat exchanger 114 but that is segregated from the refrigerant. In some embodiments, outdoor heat exchanger 114 may comprise a plate-fin heat exchanger. However, in other embodiments, outdoor heat exchanger 114 may comprise a spine-fin heat exchanger, a microchannel heat exchanger, or any other suitable type of heat exchanger. While not specifically shown, it should be appreciated that outdoor heat exchanger 114 may include a coil similar to coil 109 previously described above for indoor heat exchanger 108.

The compressor 116 may generally comprise a variable speed scroll-type compressor that may generally be configured to selectively pump refrigerant at a plurality of mass flow rates through the indoor unit 102, the outdoor unit 104, and/or between the indoor unit 102 and the outdoor unit 104. In some embodiments, the compressor 116 may comprise a rotary type compressor configured to selectively pump refrigerant at a plurality of mass flow rates. In some embodiments, however, the compressor 116 may comprise a modulating compressor that is capable of operation over a plurality of speed ranges, a reciprocating-type compressor, a single speed compressor, and/or any other suitable refrigerant compressor and/or refrigerant pump. In some embodiments, the compressor 116 may be controlled by a compressor drive controller 144, also referred to as a compressor drive and/or a compressor drive system.

The outdoor fan 118 may generally comprise an axial fan comprising a fan blade assembly and fan motor configured to selectively rotate the fan blade assembly. The outdoor fan 118 may generally be configured to provide airflow through the outdoor unit 104 and/or the outdoor heat exchanger 114 to promote heat transfer between the airflow and a refrigerant flowing through the indoor heat exchanger 108. The outdoor fan 118 may generally be configured as a modulating and/or variable speed fan capable of being operated at a plurality of speeds over a plurality of speed ranges. In other embodiments, the outdoor fan 118 may comprise a mixed-flow fan, a centrifugal blower, and/or any other suitable type of fan and/or blower, such as a multiple speed fan capable of being operated at a plurality of operating speeds by selectively electrically powering different multiple electromagnetic windings of a motor of the outdoor fan 118. In yet other embodiments, the outdoor fan 118 may be a single speed fan. Further, in other embodiments, the outdoor fan 118 may comprise a mixed-flow fan, a centrifugal blower, and/or any other suitable type of fan and/or blower.

The outdoor metering device 120 may generally comprise a thermostatic expansion valve. In some embodiments, however, the outdoor metering device 120 may comprise an electronically-controlled motor driven EEV similar to indoor metering device 112, a capillary tube assembly, and/or any other suitable metering device. In some embodiments, while the outdoor metering device 120 may be configured to meter the volume and/or flow rate of refrigerant through the outdoor metering device 120, the outdoor metering device 120 may also comprise and/or be associated with a refrigerant check valve and/or refrigerant bypass configuration when the direction of refrigerant flow through the outdoor metering device 120 is such that the outdoor metering device 120 is not intended to meter or otherwise substantially restrict flow of the refrigerant through the outdoor metering device 120.

The reversing valve 122 may generally comprise a four-way reversing valve. The reversing valve 122 may also comprise an electrical solenoid, relay, and/or other device configured to selectively move a component of the reversing valve 122 between operational positions to alter the flow path of refrigerant through the reversing valve 122 and consequently the HVAC system 100. Additionally, the reversing valve 122 may also be selectively controlled by the system controller 106 and/or an outdoor controller 126.

The system controller 106 may generally be configured to communicate with an indoor controller 124 of the indoor unit 102, an outdoor controller 126 of the outdoor unit 104, and/or other components of the HVAC system 100. In some embodiments, the system controller 106 may be configured to control operation of the indoor unit 102 and/or the outdoor unit 104. In some embodiments, the system controller 106 may be configured to monitor and/or communicate, directly or indirectly, with a plurality of sensors associated with components of the indoor unit 102, the outdoor unit 104, etc. The sensors may measure or detect a variety of parameters, such as, for example, pressure, temperature, and flow rate of the refrigerant as well as pressure and temperature of other components or fluids of or associated with HVAC system 100. In some embodiments, the HVAC system 100 may include a sensor (or plurality of sensors) for sensing or detecting the ambient outdoor temperature. Additionally, in some embodiments, the system controller 106 may comprise a temperature sensor and/or may further be configured to control heating and/or cooling of zones associated with the HVAC system 100 (e.g., within the indoor space). In some embodiments, the system controller 106 may be configured as a thermostat, having a temperature sensor and a user interface, for controlling the supply of conditioned air to zones associated within the HVAC system 100.

The system controller 106 may also be in communication with an input/output (I/O) unit 107 (e.g., a graphical user interface, a touchscreen interface, or the like) for displaying information and for receiving user inputs. The I/O unit 107 may display information related to the operation of the HVAC system 100 (e.g., from system controller 106) and may receive user inputs related to operation of the HVAC system 100. During operations, I/O unit 107 may communicate received user inputs to the system controller 106, which may then execute control of HVAC system 100 accordingly. Communication between the I/O unit 107 and system controller 106 may be wired, wireless, or a combination thereof. In some embodiments, the I/O unit 107 may further be operable to display information and receive user inputs tangentially and/or unrelated to operation of the HVAC system 100. In some embodiments, however, the I/O unit 107 may not comprise a display and may derive all information from inputs from remote sensors and remote configuration tools (e.g., remote computers, servers, smartphones, tablets, etc.). In some embodiments, system controller 106 may receive user inputs from remote configuration tools, and may further communicate information relating to HVAC system 100 to I/O unit 107. In these embodiments, system controller 106 may or may not also receive user inputs via I/O unit 107.

In some embodiments, the system controller 106 may be configured for selective bidirectional communication over a communication bus 128. In some embodiments, portions of the communication bus 128 may comprise a three-wire connection suitable for communicating messages between the system controller 106 and one or more of the HVAC system 100 components configured for interfacing with the communication bus 128. Still further, the system controller 106 may be configured to selectively communicate with HVAC system 100 components and/or any other device 130 via a communication network 132. In some embodiments, the communication network 132 may comprise a telephone network, and the other device 130 may comprise a telephone. In some embodiments, the communication network 132 may comprise the Internet, and the other device 130 may comprise a smartphone and/or other Internet-enabled mobile telecommunication device. In other embodiments, the communication network 132 may also comprise a remote server.

The indoor controller 124 may be carried by the indoor unit 102 and may generally be configured to receive information inputs, transmit information outputs, and/or otherwise communicate with the system controller 106, the outdoor controller 126, and/or any other device 130 via the communication bus 128 and/or any other suitable medium of communication. In some embodiments, the indoor controller 124 may be configured to communicate with an indoor personality module 134 that may comprise information related to the identification and/or operation of the indoor unit 102. In some embodiments, the indoor controller 124 may be configured to receive information related to a speed of the indoor fan 110, transmit a control output to an electric heat relay, transmit information regarding an indoor fan 110 volumetric flow-rate, communicate with and/or otherwise affect control over an air cleaner or filter 136, and communicate with an indoor EEV controller 138. In some embodiments, the indoor controller 124 may be configured to communicate with an indoor fan controller 142 and/or otherwise affect control over operation of the indoor fan 110. In some embodiments, the indoor personality module 134 may comprise information related to the identification and/or operation of the indoor unit 102 and/or a position of the outdoor metering device 120.

The indoor EEV controller 138 may be configured to receive information regarding temperatures and/or pressures of the refrigerant in the indoor unit 102. More specifically, the indoor EEV controller 138 may be configured to receive information regarding temperatures and pressures of refrigerant entering, exiting, and/or within the indoor heat exchanger 108. Further, the indoor EEV controller 138 may be configured to communicate with the indoor metering device 112 and/or otherwise affect control over the indoor metering device 112. The indoor EEV controller 138 may also be configured to communicate with the outdoor metering device 120 and/or otherwise affect control over the outdoor metering device 120.

The outdoor controller 126 may be carried by the outdoor unit 104 and may be configured to receive information inputs, transmit information outputs, and/or otherwise communicate with the system controller 106, the indoor controller 124, and/or any other device 130 via the communication bus 128 and/or any other suitable medium of communication. In some embodiments, the outdoor controller 126 may be configured to communicate with an outdoor personality module 140 that may comprise information related to the identification and/or operation of the outdoor unit 104. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the compressor 116, the outdoor fan 118, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be configured to communicate with and/or control a compressor drive controller 144 that is configured to electrically power and/or control the compressor 116.

System controller 106, indoor controller 124, and outdoor controller 126 (as well as compressor drive controller 144, indoor fan controller 142, indoor EEV controller 138, etc.) may each comprise any suitable device or assembly which is capable of receiving electrical (or other data) signals and transmitting electrical (or other data) signals to other devices. In particular, while not specifically shown, system controller 106, indoor controller 124, and outdoor controller 126 (as well as controllers 138, 142, 144, etc.) may each include a processor and a memory. The processors (e.g., microprocessor, central processing unit, or collection of such processor devices, etc.) may execute machine readable instructions (e.g., non-transitory machine readable medium) provided on the corresponding memory to provide the processor with all of the functionality described herein. The memory of each controller 106, 124, 126 may comprise volatile storage (e.g., random access memory), non-volatile storage (e.g., flash storage, read only memory, etc.), or combinations of both volatile and non-volatile storage. Data consumed or produced by the machine readable instructions can also be stored on the memory of controllers 106, 124, 126.

During operations, system controller 106 may generally control the operation of HVAC system 100 through the indoor controller 124 and outdoor controller 126 (e.g., via communication bus 128). In the description below, specific control methods are described (e.g., method 300). It should be understood that the features of these described methods may be performed (e.g., wholly or partially) by system controller 106, or by one or more of the indoor controller 124, and outdoor controller 126 as directed by system controller 106. As a result, the controller or controllers of HVAC system 100 (e.g., controllers 106, 124, 126, 142, 144, 138, etc.) may include and execute machine-readable instructions (e.g., non-volatile machine readable instructions) for performing the operations and methods described in more detail below. In some embodiments, each of the controllers 106, 124, 126 may be embodied in a singular control unit, or may be dispersed throughout the individual controllers 106, 124, 126 as described above.

As shown in FIG. 1, the HVAC system 100 is configured for operating in a so-called cooling mode in which heat may generally be absorbed by refrigerant at the indoor heat exchanger 108 and rejected from the refrigerant at the outdoor heat exchanger 114. Starting at the compressor 116, the compressor 116 may be operated to compress refrigerant and pump the relatively high temperature and high pressure compressed refrigerant through the reversing valve 122 and to the outdoor heat exchanger 114, where the refrigerant may transfer heat to an airflow that is passed through and/or into contact with the outdoor heat exchanger 114 by the outdoor fan 118. After exiting the outdoor heat exchanger 114, the refrigerant may flow through and/or bypass the outdoor metering device 120, such that refrigerant flow is not substantially restricted by the outdoor metering device 120. Refrigerant generally exits the outdoor metering device 120 and flows to the indoor metering device 112, which may meter the flow of refrigerant through the indoor metering device 112, such that the refrigerant downstream of the indoor metering device 112 is at a lower pressure than the refrigerant upstream of the indoor metering device 112. From the indoor metering device 112, the refrigerant may enter the indoor heat exchanger 108. As the refrigerant is passed through coil 109 of the indoor heat exchanger 108, heat may be transferred to the refrigerant from an airflow that is passed through and/or into contact with the indoor heat exchanger 108 by the indoor fan 110. Refrigerant leaving the indoor heat exchanger 108 may flow to the reversing valve 122, where the reversing valve 122 may be selectively configured to divert the refrigerant back to the compressor 116, where the refrigeration cycle may begin again.

To operate the HVAC system 100 in the so-called heating mode, the reversing valve 122 may be controlled to alter the flow path of the refrigerant, the indoor metering device 112 may be disabled and/or bypassed, and the outdoor metering device 120 may be enabled. In the heating mode, refrigerant may flow from the compressor 116 to the indoor heat exchanger 108 through the reversing valve 122, the refrigerant may be substantially unaffected by the indoor metering device 112, the refrigerant may experience a pressure differential across the outdoor metering device 120, the refrigerant may pass through the outdoor heat exchanger 114, and the refrigerant may re-enter the compressor 116 after passing through the reversing valve 122. Most generally, operation of the HVAC system 100 in the heating mode reverses the roles of the indoor heat exchanger 108 and the outdoor heat exchanger 114 as compared to their operation in the cooling mode.

Figure 2:
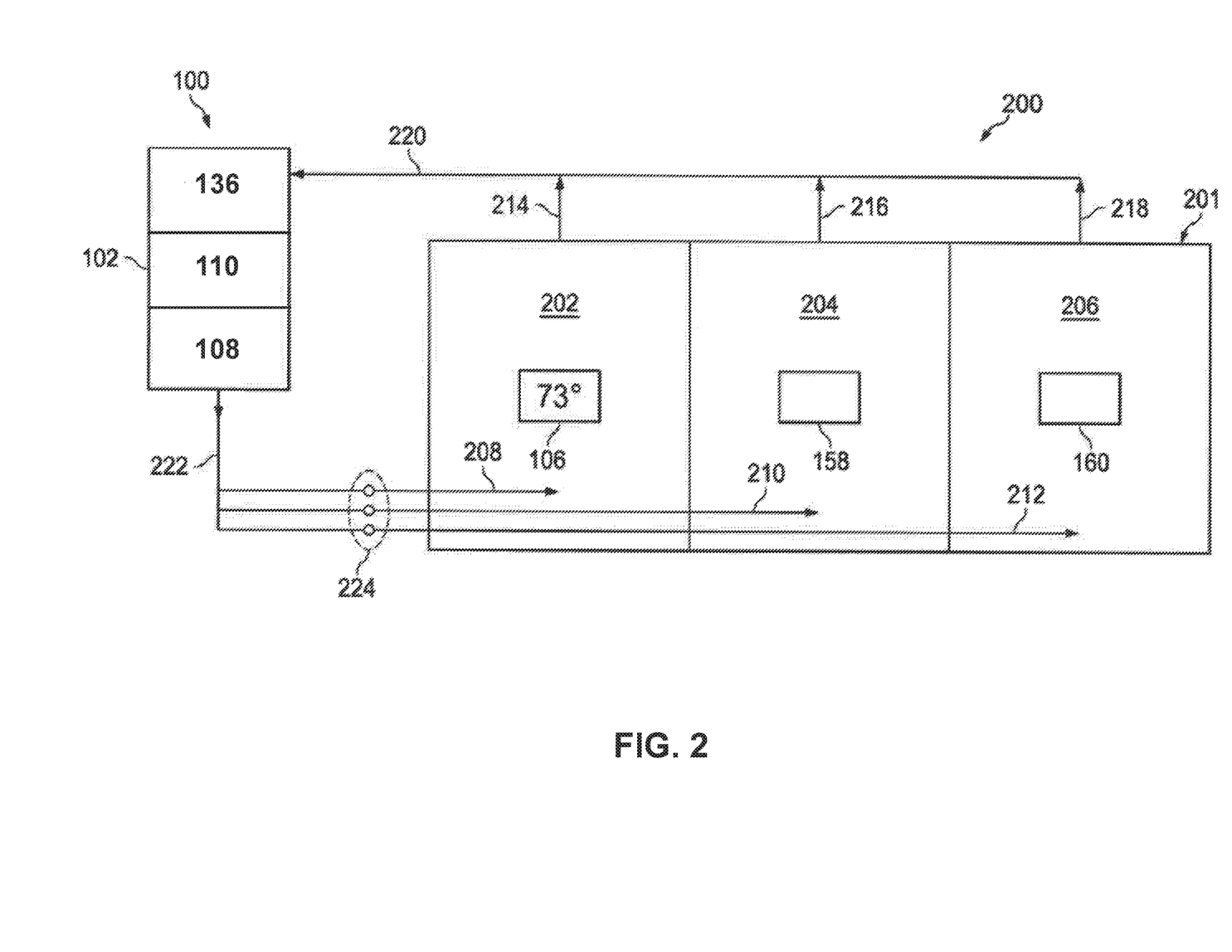
FIG. 2 is a schematic diagram of an air circulation path of the HVAC system of FIG. 1 according to an embodiment of the disclosure.

Referring now to FIG. 2, a schematic diagram of an air circulation path 200 of the HVAC system 100 of FIG. 1 is shown according to an embodiment of the disclosure. It will be appreciated that while three zones 202, 204, 206 are shown, any number of zones may be present in an indoor area or structure 201. Where present, the plurality of zones may be conditioned independently or together in one or more groups. The air circulation path 200 of the HVAC system 100 may generally comprise a first zone supply duct 208, a second zone supply duct 210, a third zone supply duct 212, a first zone return duct 214, a second zone return duct 216, a third zone return duct 218, a main return duct 220, and a main supply duct 222. A plurality of zone dampers 224 may be optionally provided. The air circulation path 200 also passes through the indoor unit 102, which may include an indoor heat exchanger 108, indoor fan 110, and an air filter 136. In some embodiments, the air filter 136 may be remote from the indoor unit 102, positioned elsewhere along the main return duct 220 or the zone return ducts 214, 216, 218. In one embodiment, the air filter 136 is positioned adjacent to an inlet to the zone return ducts 214, 216, 218.

In operation, the indoor fan 110 may be configured to generate an airflow through the indoor unit 102 to deliver temperature conditioned air from an air supply opening in the indoor unit 102, through the main supply duct 222, and to each of the plurality of zones 202, 204, 206 through each of the first zone supply duct 208, the second zone supply duct 210, and the third zone supply duct 212, respectively. Additionally, each of the first zone supply duct 208, the second zone supply duct 210, and the third zone supply duct 212 may optionally comprise a zone damper 224 that regulates the airflow to each of the zones 202, 204, 206. In some embodiments, the zone dampers 224 may regulate the flow to each zone 202, 204, 206 in response to a temperature or humidity sensed by at least one temperature sensor and/or humidity sensor carried by at least one of the system controller 106, a zone thermostat 158, and a zone sensor 160.

Air from each zone 202, 204, 206 may return to the main return duct 220 through each of the first zone return duct 214, the second zone return duct 216, and the third zone return duct 218. From the main return duct 220, air may return to the indoor unit 102 through an air return opening in the indoor unit 102. Air entering the indoor unit 102 through the air return opening may then be conditioned for delivery to each of the plurality of zones 202, 204, 206 as described above. Circulation of the air in this manner may continue repetitively until the temperature and/or humidity of the air within the zones 202, 204, 206 conforms to a target temperature as required by at least one of the system controller 106, the zone thermostat 158, and/or the zone sensor 160.

To operate the HVAC system 100 in the so-called fan only mode, indoor fan 110 of indoor unit 102 may be operated to circulate air to the plurality of zones 202, 204, 206 of indoor area 201. When HVAC system 100 is operated in the fan only mode, compressor 116 of outdoor unit 104 may not be operated so that refrigerant is not circulated through indoor heat exchanger 108. Thus, when HVAC system 100 is operated in the fan only mode, air may be circulated to the plurality of zones 202, 204, 206 of indoor area 201 without conditioning the air via transferring heat between the air and refrigerant circulated through indoor heat exchanger 108.

During the operation of HVAC system 100 in any of the cooling, heating, and fan only modes, circulation of air to the plurality of zones 202, 204, and 206 of indoor area 201 by indoor fan 110 produces an external static pressure (ESP) across indoor unit 102 defined by a difference between a supply static pressure of air circulated through main supply duct 222 and a return static pressure of air circulating through main return duct 220. Airflow and ESP produced by indoor fan 110 may be estimated by continuously measuring motor speed and torque of the motor of indoor fan 110.

Particularly, components of indoor unit 102 including indoor heat exchanger 108 and indoor fan 110 may be housed within a cabinet to form a self-contained air handling unit (AHU). Prior to installation of indoor unit 102 at structure 201, the AHU of indoor unit 102 (or another AHU similar in configuration to the AHU of indoor unit 102) may be tested at an air plenum test facility at a range of known airflows and ESPs (i.e., independently measured by equipment of the test facility) to thereby create AHU maps correlating airflow and ESP of the AHU with motor speed and torque of the indoor fan 110 of the AHU. For example, a first AHU map may include airflow along an X-axis thereof, motor power (which may be calculated from a measured motor torque) along a Y-axis thereof, and a plurality of curves each corresponding to a fixed motor speed. In this manner, airflow may be "looked-up" from the AHU map from a known motor speed and torque. A second AHU map may include airflow along an X-axis thereof, ESP along a Y-axis thereof, and a plurality of curves each corresponding to a fixed motor speed, from which the ESP may be looked-up given the known motor speed and airflow (determined from the first AHU map).

The AHU maps created during testing may be stored in the memory of the system controller 106. In this manner, system controller 106 of HVAC system 100 may apply measured motor speed and torque values communicated to system controller 106 from indoor fan controller 142 to the AHU maps stored in the memory of system controller 106 to thereby determine or look-up an estimated airflow and an estimated ESP provided by the indoor fan 110 corresponding to the measured motor speed and torque of the indoor fan 110.

Figure 3:
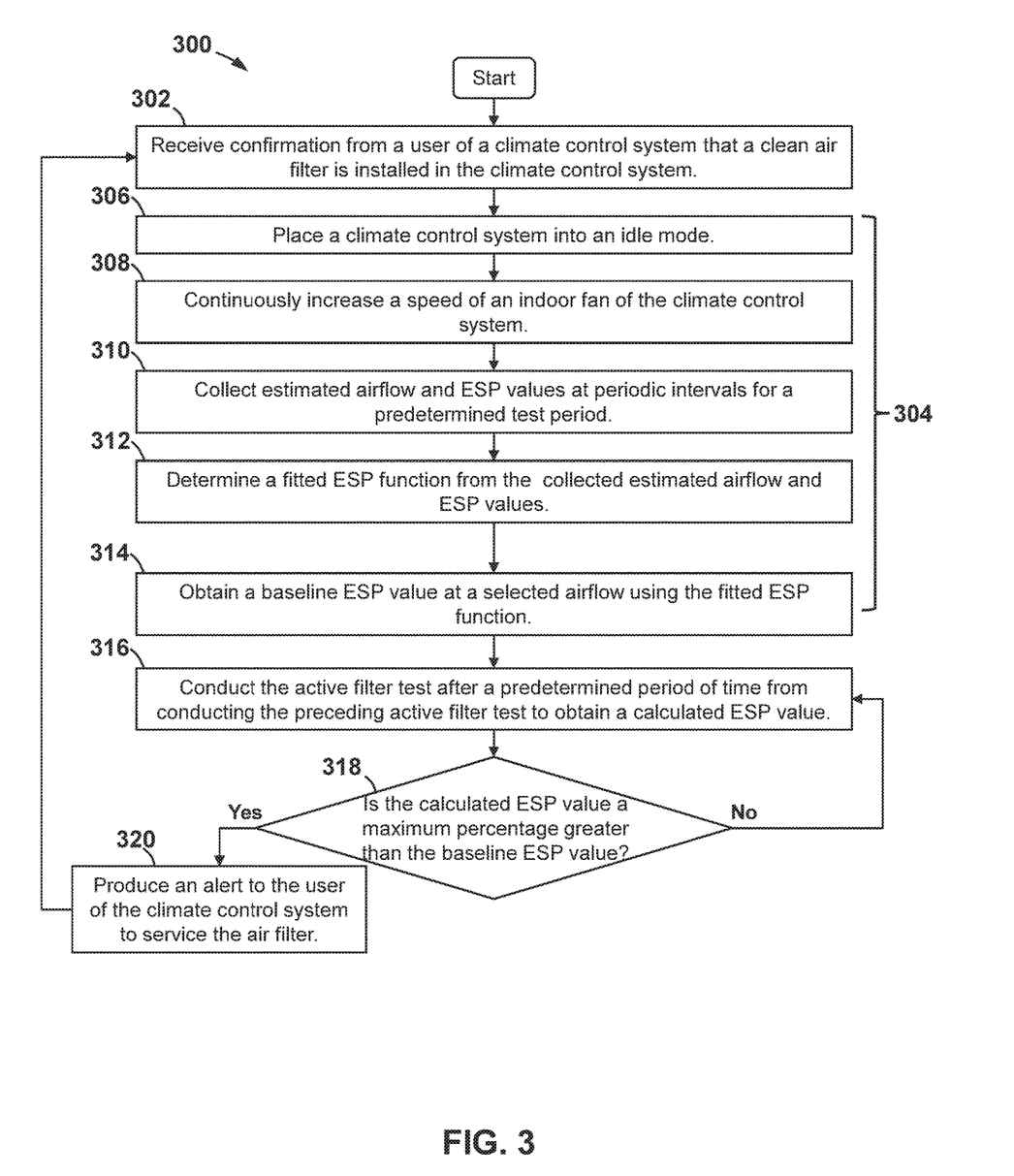
FIG. 3 is a flow chart of a method of determining a condition of an air filter of a climate control system according to some embodiments.

Referring now to FIGS. 1-3, a method 300 of determining a condition of an air filter or cleaner of a climate control system is shown in FIG. 3. In some embodiments, method 300 may be practiced with HVAC system 100 while HVAC system 100 is operated in the fan only mode as previously described above (see e.g., FIGS. 1, 2). Thus, in describing the features of method 300, continuing reference will made to the HVAC system 100 shown in FIGS. 1, 2; however, it should be appreciated that embodiments of method 300 may be practiced with other systems, assemblies, and devices.

Generally speaking, method 300 includes comparing a calculated or modeled ESP value (e.g., a calculated ESP value of the HVAC system 100 shown in FIGS. 1, 2) with a baseline ESP value (which is also calculated or modeled) obtained with a clean air filter installed in the climate control system. Method 300 may also generally include providing a user of the climate control system (e.g., a homeowner and/or system installer of the HVAC system 100) with an alert to the user of the climate control system that the air filter needs to be serviced (e.g., cleaned or replaced) based on the comparison between the calculated ESP value and the baseline ESP value. As will be described in more detail below, performance of some or all of the steps of method 300 may be cyclical or repeated during the lifetime of the climate control system so as to continually monitor a condition (e.g., fouling) of the air filter of the climate control system and to ensure that the air filter is timely serviced once fouled.

Initially, method 300 includes receiving confirmation from a user of a climate control system that a clean air filter is installed in the climate control system at block 302. In some embodiments, block 302 may comprise a homeowner providing a user input to the I/O unit 107 of HVAC system 100 that a clean air filter 136 is installed, for instance, at the inlet of indoor unit 102 of HVAC system 100, or, in other embodiments, at other locations remote from indoor unit 102. For example, the homeowner may provide the user input to I/O unit 107 following the replacement of a fouled air filter 136 with a clean air filter 136. In some embodiments, block 302 may comprise an installer of HVAC system 100 providing a user input to the I/O unit 107 following the commissioning of HVAC system 100. The user input provided to the I/O unit 107 by the user of HVAC system 100 may be communicated to the system controller 106 of HVAC system 100. Alternatively, confirmation from the user as described in block 302 may be indirect. For example, a commissioning process of the HVAC system 100 may automatically provide a signal indicative of a clean air filter.

Method 300 also includes conducting an active filter test to obtain the baseline ESP value at bracket 304, where the active filter test comprises the execution of blocks 306-314 of method 300. Generally speaking, the active filter test defined by blocks 306-314 includes operating the climate control system in the fan only mode without a demand for heating or cooling to generate data (including blocks 306, 308, and 310) and performing calculations on the generated data (including blocks 312, 314) to obtain a calculated ESP value of the climate control system at a selected airflow which may be used, in some embodiments, for detecting fouling of an air filter of the climate control system. In some embodiments, bracket 304 of method 300 may comprise obtaining a baseline ESP value provided by the indoor fan 110 of the HVAC system 100 shown in FIGS. 1, 2 at a predetermined selected airflow provided by indoor fan 110 for detecting fouling of the air filter 136 of the HVAC system 100. In some embodiments, the selected airflow is programmed into the memory of system controller 106. In other embodiments, the selected airflow is stored on a remote server of communication network 132. In certain embodiments, the selected airflow may be entered into system controller 106 or communication network 132 by the installer of HVAC system 100. In other embodiments, the selected airflow is preprogrammed into system controller 106 as part of the process for manufacturing system controller 106. The selected airflow may be a fraction (e.g., 50%-100%) of a maximum airflow that may be provided by the indoor fan 110 that is sufficiently large such that fouling of air filter 136 may result in a detectable increase in ESP provided by indoor fan 110 at the selected airflow relative to the baseline ESP value at the selected airflow.

As will be described further herein, conducting an active filter test, including the active filter test to obtain the baseline ESP value at bracket 304, includes placing a climate control system in an idle mode at block 306, continuously increasing a speed of an indoor fan of the climate control system at block 308, collecting estimated airflow and ESP values at periodic intervals for a predetermined test period at block 310, obtaining estimated airflow start values and estimated ESP start values, and estimated airflow end values and estimated ESP end values from the collected estimated airflow and ESP values at block 312; and obtaining a calculated ESP value at a selected airflow normalized by a maximum airflow that may be provided by the indoor fan at block 314. Thus, unlike a passive filter test where estimated airflow and ESP values are collected passively as the climate control system is in a heating or cooling mode to conform a temperature and/or humidity of an indoor space to a target temperature and/or humidity, in the active filter test the climate control system is first placed in an idle mode and then airflow and ESP values are collected as the speed of an indoor fan of the climate control system is continuously increased or ramped up from zero (corresponding to the idle mode of the climate control system). As described above, initially the active filter test corresponding to bracket 304 of method 300 includes placing a climate control system into an idle mode at block 306. In some embodiments, block 306 of method 300 may comprise placing HVAC system 100 shown in FIGS. 1, 2 into an idle mode where indoor fan 110 of HVAC system 100 remains idle and air is not circulated along the air circulation path 200 shown in FIG. 2. The compressor 116 is also inactive during the idle mode such that refrigerant is not actively being circulated through the heat exchanger 108. In some embodiments, block 306 of method 300 may be initiated by a user of HVAC system 100. For example, a homeowner may provide an input to the I/O unit 107 of HVAC system 100 commanding system controller 106 to initiate block 306 of method 300. In another example, a system installer of HVAC system 100 may provide an input to device 130 that is communicated to system controller 106 via communication network 132 which commands control system 106 to initiate block 306 of method 300. In some embodiments, block 306 of method 300 may comprise opening all zone dampers of a structure or indoor area, if present. For example, block 306 may comprise opening each of the plurality of zone dampers 224 of the indoor area 201 shown in FIG. 2.

As described above, method 300 also includes continuously increasing a speed of an indoor fan of the climate control system at block 308. In some embodiments, block 308 of method 300 may comprise transmitting a maximum airflow command from system controller 106 of HVAC system 100 to the indoor fan controller 142 such that a speed and an airflow produced by indoor fan 110 continuously increases from zero (corresponding to the idle mode of HVAC system 100) towards a maximum airflow that may be provided by the indoor fan 110. Additionally, block 308 may comprise placing HVAC system 100 into the fan only mode.

With the speed of the indoor fan continuously increasing, method 300 proceeds by collecting estimated airflow and estimated ESP values at periodic intervals as the speed and airflow produced by the indoor fan increases at block 310. In some embodiments, block 310 of method 300 comprises collecting estimated airflow and ESP values of the indoor unit 102 of HVAC system 100 as the speed and airflow produced by indoor fan 110 of HVAC system 100 increases. For example, system controller 106 may collect estimated airflow and estimated ESP values by continuously measuring motor speed and torque of indoor fan 110 and estimating the estimated airflow and ESP values from the measured motor speed and torque using AHU maps stored in the memory of system controller 106 as described above. Each periodic interval may be approximately five seconds in duration, however, the duration of each periodic interval may vary.

Figure 4:
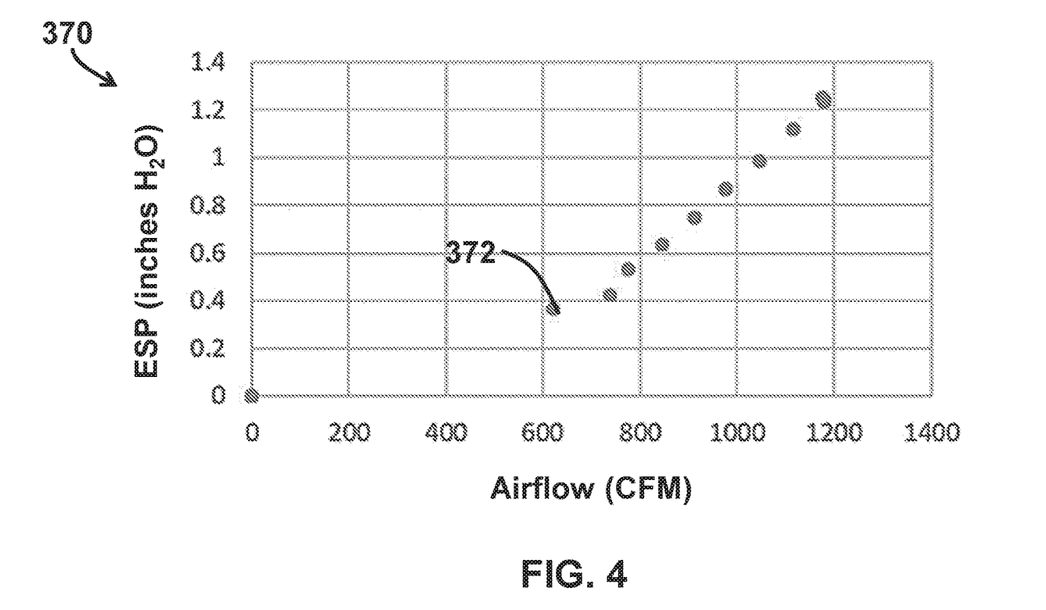
FIG. 4 is a graph illustrating estimated airflow and ESP of a climate control system according to some embodiments.

Referring briefly to FIG. 4, an exemplary estimated airflow-ESP chart 370 is shown that illustrates airflow in cubic feet per minute (CFM) on an X-axis thereof and ESP in inches of $H_2O$ and a Y-axis thereof. Circles 372 of estimated airflow-ESP chart 370 represent measured airflow and ESP values obtained at block 310 of the method 300 shown in FIG. 3. As indicated in estimated airflow-ESP chart 370, estimated ESP increases with increasing airflow produced by the indoor fan of the climate control system, with the first non-zero estimated ESP value occurring at an airflow of approximately 600 CFM. Estimated airflow-ESP chart 370 serves to illustrate the general behavior of estimated airflow and measured ESP values obtained at block 310, and the estimated airflow and ESP values collected at block 310 of method 300 may vary significantly from those shown in FIG. 4.

Referring again to FIGS. 1-3, as estimated airflow and ESP values are collected, a fitted ESP function is determined from the collected estimated airflow and ESP values at block 312 of method 300. In some embodiments, block 312 of method 300 includes determining ESP and airflow or airflow rate start ($ESP_{start}$ and, $Airflow_{start}$, respectively) values and ESP and airflow or airflow rate end ($ESP_{end}$ and, $Airflow_{end}$, respectively) values used to determine the slope and intercept of the fitted ESP function, as will be described further herein.

The $ESP_{start}$ and $Airflow_{start}$ values may be determined by identifying the first non-zero estimated airflow value collected at block 310, and saving the third estimated non-zero airflow value as the $Airflow_{start}$ value. For example, if the first non-zero estimated airflow data is identified at the n periodic interval, then the estimated airflow data at the n+2 periodic interval may be saved as the $Airflow_{start}$ value; however, in other embodiments, the estimated airflow data at the n+1 n+4, etc., may comprise the $Airflow_{start}$ value. Similarly, block 312 may comprise saving the third estimated ESP value following the identified first non-zero estimated airflow value as the $ESP_{start}$ value.

The $ESP_{end}$ and $Airflow_{end}$ values may be determined by identifying the emergence of a pseudo-steady state maximum for the estimated airflow and estimated ESP values collected at block 310 and saving the pseudo-steady state maximum estimated airflow and estimated ESP values as the $Airflow_{end}$ value and the $ESP_{end}$ value. In some embodiments, the pseudo-steady state maximum estimated airflow and estimated ESP values may be determined via a comparison to a moving or rolling average of estimated ESP values. For example, a predetermined number (e.g., four neighboring estimated ESP values in this example) of neighboring estimated ESP values may be averaged to determine a first rolling average of estimated ESP values, and the first rolling average may be compared to the estimated ESP value collected immediately prior (the "first prior estimated ESP value") to the collection of the four estimated ESP values defining the first rolling average. In this example, the first prior estimated ESP value is determined to be the pseudo-steady state maximum estimated ESP value if the first prior estimated ESP value is less than the first rolling average. If the first prior estimated ESP value is less than the first rolling average, then the process continues by substituting the first prior estimated ESP value with a second prior estimated ESP value comprising the estimated ESP value that was collected first of the four estimated ESP values defining the first rolling average, and determining a second rolling average by averaging the next four estimated ESP values that immediately follow the second prior estimated ESP value. The second prior estimated ESP value may then be compared with the second rolling average and so on and so forth. In other embodiments, other methodologies may be used to determine the pseudo-steady state maximum airflow and ESP values rather than a rolling or moving average. For instance, the pseudo-steady state maximum ESP value may be determined in response to a slope of the estimated ESP values over time being negative or less than a predetermined slope.

In some embodiments, the identified $ESP_{start}$ and, $Airflow_{start}$ values and the identified $ESP_{end}$ and, $Airflow_{end}$ values may each be saved into the memory of the system controller 106 of HVAC system 100. In certain embodiments, the identified ESP start and $Airflow_{start}$ values and the identified $ESP_{end}$ and $Airflow_{end}$ values may each be transmitted to device 130 via communication network 132. In some embodiments, once the $ESP_{end}$ and $Airflow_{end}$ values have been collected, the climate control system may return to normal operation. For example, in some embodiments, following the collection of the $ESP_{end}$ and $Airflow_{end}$ values, HVAC system 100 may return to the cooling or heating mode. Although the duration of the ramping of the speed of the indoor fan of the climate control system at block 308 is not fixed or predefined, in most applications only a few minutes (e.g., two to three minutes) will be required for performing the active filter test before the climate control system may be returned to normal operation.

Once $ESP_{start}$, $Airflow_{end}$, $ESP_{end}$ and, $Airflow_{end}$ values have each been identified and saved, method 300 proceeds by obtaining a calculates ESP value at a selected airflow using the fitted ESP function at block 314. Given that bracket 304 of method 300 is executed immediately following the execution of block 302, the calculated ESP value obtained at block 314 of bracket 304 comprises a baseline ESP value of the climate control system obtained with a clean air filter (e.g., air filter 136 of HVAC system 100) installed in the climate control system.

In some embodiments, the selected airflow is normalized by a maximum airflow that may be provided by the indoor fan of the climate control system at block 314. The maximum airflow of the indoor fan of the climate control system may be predetermined and based upon the configuration of the indoor fan and climate control system, and thus, the maximum airflow may vary depending upon the configuration of the fan and climate control system. Without being limited to this or any other theory, the calculated ESP value may be obtained by the following computation, where the calculated ESP value obtained at block 314 is represented by $ESP_{calculated}$, the maximum airflow is represented by $Airflow_{maximum}$, and A, B are constants which will be described further herein:

$$ESP_{calculated} = A\left(\frac{Airflow_{select}}{Airflow_{maximum}}\right) + B \quad (1)$$

Not intending to be limited to this or any other theory, the constant A of equation (1) above may be obtained by the following computation:

$$A = \frac{ESP_{start} - ESP_{end}}{\frac{Airflow_{start}}{Airflow_{target}} - \frac{Airflow_{end}}{Airflow_{target}}} \quad (2)$$

Not intending to be limited to this or any other theory, the constant B of equation (1) above may be obtained by the following computation:

$$B = ESP_{end} - \frac{Airflow_{end}}{Airflow_{target}} \quad (3)$$

In some embodiments, the fitted ESP function of block 312 comprises Equation (1) above while constant A defines a slope of the fitted ESP function and constant B defines an intercept of the fitted ESP function. Thus, block 314 of method 300 may include solving the fitted ESP function (comprising Equation (1) above) determined at block 312 by entering constants A, B, and the selected airflow (represented by ESP calculated in equation (1) above) into Equation (1). Thus, the $Airflow_{start}$, $Airflow_{end}$ values and the $ESP_{start}$, $ESP_{end}$ values bound or delimit the estimated airflow and ESP values used to obtain the calculated ESP value. The selected airflow may comprise a predetermined percentage of the maximum airflow. As described above, the selected airflow may be a fraction (e.g., 50%-100%) of the maximum airflow that may be provided by the indoor fan 110 that is substantially large enough to create an appreciable pressure drop across air filter 136 but that is less than the maximum airflow given that the motor of indoor fan 110 may be torque-limited or otherwise prevented from achieving a full 100% of the maximum airflow. In some embodiments, the selected airflow is approximately 80% of the maximum airflow; however, in other embodiments, the selected airflow of a given target airflow may vary. For example, in an embodiment where the selected airflow comprises 80% of the maximum airflow and the maximum airflow is approximately 1,200 CFM, the selected airflow may comprise 80% of the maximum airflow or approximately 960 CFM.

Figure 5:
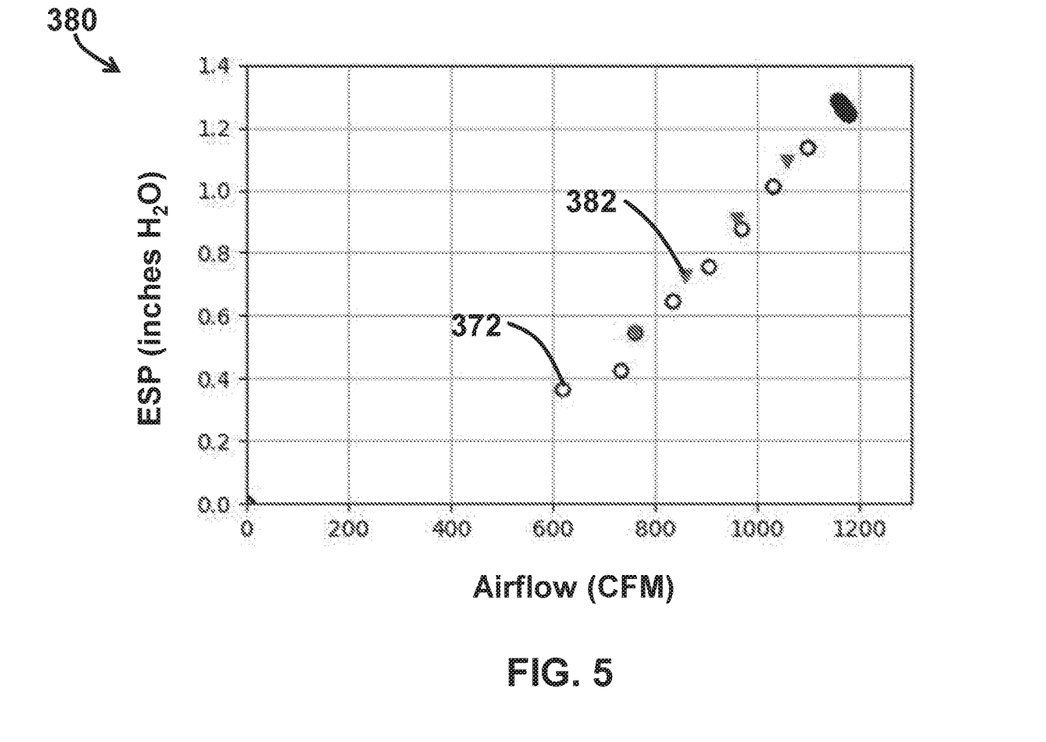
FIG. 5 is a graph illustrating fitted airflow and ESP of a climate control system according to some embodiments.

Referring briefly to FIG. 5, an exemplary fitted airflow-ESP chart 380 is shown that illustrates airflow in CFM on an X-axis thereof and ESP in inches of $H_2O$ on a Y-axis thereof. In addition to the estimated airflow and ESP values indicated by circles 372, fitted airflow-ESP chart 380 comprises triangles 382 which represent calculated ESP values at a range of selected airflows. Thus, each triangle 382 of fitted airflow-ESP chart 380 is obtained from equations (1)-(3) above for varying selected airflows. Thus, given that the $ESP_{start}$ value of equations (1)-(3) comprises the third measured non-zero airflow value, two non-zero airflow circles 372 are shown on fitted airflow-ESP chart 380 prior to the first or lowest non-zero airflow triangle 382. Also as illustrated in fitted airflow-ESP chart 380, the selected airflow of any of the calculated ESP values represented by triangles 382 need not comprise one of the measured airflows obtained at block 310 of the method 300 shown in FIG. 3. Instead, the selected airflow on which the calculated ESP value is obtained may comprise any airflow between the $Airflow_{start}$ value and the $Airflow_{end}$ value. Fitted airflow-ESP chart 380 serves to illustrate the general behavior of the calculated ESP values for varying selected airflows, and the calculated ESP value obtained at block 314 of the method 300 shown in FIG. 3 may vary significantly from those shown in FIG. 5.

Still referring to FIGS. 1-3, method 300 also includes conducting an active filter test after a predetermined period of time from conducting the previous active filter test to obtain a calculated ESP value at block 316. In some embodiments, block 316 comprises performing the steps defined by blocks 306-314 described above after the predetermined period of time from conducting the previous active filter test at bracket 304 of method 300 has elapsed. Thus, in some embodiments, block 316 of method 300 comprises obtaining, instead of the baseline ESP value, a calculated ESP value of the HVAC system 100 shown in FIGS. 1, 2 at the predefined selected airflow. Thus, the steps defined by blocks 306-314 may be performed to obtain both the baseline ESP value obtained at bracket 304 of method 300 and the calculated ESP value obtained at block 316 of method 300. In this manner, the active filter test defined by blocks 306-314 of method 300 may be used to detect fouling of an air filter of the climate control system.

The predetermined period of time between the conducting of the active filter test for obtaining the baseline ESP value and the conducting the active filter test to obtain the calculated ESP value may be approximately one month for indoor areas (e.g., indoor area 201 shown in FIG. 2) comprising a residential home; however, the duration of the predetermined period of time may vary depending upon the configuration of the structure and climate control system. For example, the predetermined time period may vary between one week and two to three months depending upon the application; however, the predetermined time period will be at least on week or greater in length in order to minimize disruption to the normal operation of the climate control system.

Method 300 further includes determining whether the calculated ESP value (obtained at block 316) is a maximum percentage greater than the baseline ESP value (obtained at block 304) at block 318. For instance, without being limited to this or any other theory, the percentage increase from the baseline ESP value to the calculated ESP value may be calculated (or estimated) by the following computation, where the baseline ESP value obtained via bracket 304 of method 300 is represented by $ESP_{base}$ and the calculated ESP value obtained at block 316 is represented by $ESP_{calculated}$:

$$\text{Percentage Increase} = \left(\frac{ESP_{calculated} - ESP_{base}}{ESP_{base}}\right)100 \qquad (4)$$

Once the percentage increase from the baseline ESP value to the calculated ESP value is calculated, block 318 of method 300 may include determining whether the calculated percentage increase is equal to or greater than a predetermined maximum percentage increase or threshold value, which would be indicative of fouling of the air filter of the climate control system (e.g., air filter 136 of HVAC system 100). In some embodiments, the maximum percentage increase is programmed into the memory of the system controller 106 of HVAC system 100. In other embodiments, the maximum percentage increase is stored on a remote server of communication network 132. In certain embodiments, the maximum percentage increase may be entered into system controller 106 or communication network 132 by the installer of HVAC system 100. In other embodiments, the maximum percentage increase is preprogrammed into system controller 106 as part of the process for manufacturing system controller 106. The maximum percentage increase is sized to indicate a pressure drop of approximately 50% across the air filter of the climate control system, a value indicative of fouling of the air filter. However, a 50% pressure drop across the air filter of the climate control system may register as less than a 50% increase in ESP provided by an indoor fan of the climate control system given that the increase in ESP provided by the indoor fan reflects pressure losses not only across the air filter, but across an entire air circulation path (e.g., air circulation path 200 shown in FIG. 2) of the climate control system, where pressure losses across the air filter only contribute a portion to the entirety of pressure losses in the climate control system. Therefore, in some embodiments the maximum percentage increase may be approximately 30% to reflect a pressure loss across the air filter of approximately 50%; however, the maximum percentage increase of block 318 of method 300 may vary depending on the particular application.

If it is determined that the percentage increase is less than the predetermined maximum percentage increase (i.e., the determination at block 318 is "No"), method 300 may return again to block 316 where an active filter test is conducted by performing the steps defined by blocks 306-314 after the predetermined period of time has passed from conducting the preceding active filter test to obtain a new or second calculated ESP value. The newly obtained calculated ESP value may then be compared with the baseline ESP value at block 318 of method 300 to determine whether the percentage increase from the baseline ESP value to the newly obtained calculated ESP value is equal to or greater than the predetermined maximum percentage increase.

If it is determined that the percentage increase is equal to or greater than the predetermined maximum percentage increase (i.e., the determination at block 318 is "Yes"), method 300 may proceed to block 320 where an alert is produced to a user of the climate control system to service the air filter. For instance, in an example where the maximum percentage increase is 30%, if a baseline ESP value of 0.7 (inches of $H_2O$) is obtained at a selected airflow of 80% of a maximum airflow of 1,200 CFM of an indoor fan of a climate control system, and a calculated ESP value of 1.0 (inches of $H_2O$) is obtained at the selected airflow of 80% of the maximum airflow of 1,200 CFM, then an alert would be produced given that the 43% percentage increase between the baseline ESP value and calculated ESP value in this example is greater than 30% maximum percentage increase.

Servicing the air filter of the climate control system may comprise replacing or cleaning the air filter. In some embodiments, block 320 of method 300 may comprise producing a visual alert on I/O unit 107 of HVAC system 100 to inform the homeowner that air filter 136 of HVAC system 100 needs to be serviced. In certain embodiments, block 320 may comprise communicating the alert to the device 130 of HVAC system 100 via communication network. For example, device 130 may comprise a server accessible by a system installer of HVAC system 100 or a technician equipped to service HVAC system 100, and in this manner the system installer or technician may be informed of the required servicing of air filter 136 by accessing device 130. Once the air filter of the climate control system has been serviced (i.e., cleaned or replaced), method 300 may return to block 302 where confirmation is received from the user of a climate control system that a clean air filter is installed in the climate control system.

Still referring to FIGS. 1-3, through use of the systems and methods described herein (e.g., HVAC system 100, method 300, etc.), the fouling of an air filter or cleaner of a climate control system may be accurately and timely detected such that the fouled air filter may be promptly replaced by a user of the climate control system. Specifically, a climate control system for an indoor space (e.g., HVAC system 100 and indoor area 201) may be operated by operating an indoor fan (e.g., indoor fan 110) of the climate control system to produce an airflow through the indoor space, obtaining a baseline ESP value (e.g., the baseline ESP value obtained at bracket 304 of method 300) of the climate control system based on a first plurality of estimated airflow values and a first plurality of estimated ESP values (e.g., airflow values and ESP values obtained at the block 310 of bracket 304 of method 300), obtaining a calculated ESP value of the climate control system based on a second plurality of estimated airflow values and a second plurality of estimated ESP values (e.g., airflow values and ESP values obtained at block 316 of method 300), and comparing the calculated ESP value to the baseline ESP value to determine a condition of an air filter of the climate control system (e.g., determination made at block 318 of method 300).

Additionally, a controller (e.g., system controller 106 of HVAC system 100) may comprise a non-transitory machine-readable medium including instructions that, when executed by a processor of the controller, cause the processor to operate the indoor fan of the climate control system to produce the airflow through the indoor space, obtain the baseline ESP of the climate control system based on the first plurality of estimated airflow values and the first plurality of estimated ESP values, obtain the calculated ESP value of the climate control system based on the second plurality of estimated airflow values and the second plurality of estimated ESP values, and compare the calculated ESP value to the baseline ESP value to determine the condition of an air filter of the climate control system.

By obtaining the baseline ESP value and the calculated ESP value of the climate control system based on a plurality of estimated airflow values and a plurality of estimated ESP values, respectively, the duration of the active filter test (e.g., as defined by blocks 306-314 of method 300) used to obtain the baseline ESP value and the calculated ESP value may be minimized so that the climate control may be returned to normal operation as quickly as possible, thereby maximizing the comfort of the homeowner. Particularly, estimated airflow and ESP values are collected as the speed and airflow produced by the indoor fan increases from an idle mode, and the collection of estimated airflow and ESP values may be terminated as soon as a pseudo-steady state airflow and a pseudo-steady state ESP are achieved. Thus, the collection of estimated airflow and ESP values begins as soon as possible during the active filter test (i.e., promptly after they become greater than zero) and is terminated as soon as possible (i.e., when a pseudo-steady state is achieved), thereby minimizing the amount of time required for collecting the estimated airflow and ESP values upon which the baseline ESP value and calculated ESP value are based. By minimizing the amount of time required for collecting the estimated airflow and ESP values upon which the baseline ESP value and calculated ESP value are based, the overall time required for conducting the active filter test may in-turn be minimized.

Further, by obtaining and comparing a calculated or modeled ESP with a baseline ESP value that is also calculated or modeled, a more accurate determination of whether an air filter of a climate control system may be made. Particularly, each calculated ESP value is based upon a plurality of "fitted" estimated airflow and ESP values rather than a single estimated ESP at a single estimated airflow or a plurality of estimated ESPs that are simply averaged together. By basing the comparison in calculated ESP value and baseline ESP value upon a plurality of estimated airflow and ESP values that are fitted as part of a model (e.g., the model described in equations (1)-(3) above), errors associated with any particular estimated airflow and/or ESP value may be mitigated.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method of operating a climate control system for an indoor space, the method comprising:
   conducting a first active filter test on the climate control system at a first time, the climate control system being installed at a given location and including a given air filter during the first active filter test, the first active filter test including:
      placing the climate control system in an idle mode, the idle mode including setting the climate control system to a fan only mode and setting an initial speed of an indoor fan of the climate control system,
      setting one or more dampers to an open position,
      increasing, from idle, a speed of an indoor fan of the climate control system to increase an airflow through the indoor space,
      determining a first fitted external static pressure (ESP) function from a first plurality of airflow values and a first plurality of ESP values, and
      obtaining a first baseline ESP value of the climate control system from the first fitted ESP function; and
   conducting a second active filter test on the climate control system at a second time, the climate control system being installed at the given location and including the given air filter during the second active filter test, the second time being at least one week after the first time, the second active filter test including:
      placing the climate control system in the idle mode,
      setting the one or more dampers to the open position,
      obtaining a second ESP value of the climate control system, and
      comparing the second ESP value to the first baseline ESP value to determine a condition of the air filter of the climate control system.

2. The method of claim 1, wherein the one or more dampers is a plurality of dampers, and setting the one or more dampers includes setting all of the plurality of dampers to the open position.

3. The method of claim 1, wherein setting the initial speed of the indoor fan includes setting the initial speed of an indoor fan to zero.

4. The method of claim 1, wherein the first active filter test further includes:
   determining an airflow start value and an ESP start value at a first airflow rate; and
   determining an airflow end value and an ESP end value at a second airflow rate which is greater than the first airflow rate.

5. The method of claim 4, wherein determining the airflow start value at the first airflow rate further includes identifying a first non-zero airflow of the first plurality of airflow values.

6. The method of claim 4, wherein determining the airflow end value and the ESP end value at the second airflow rate comprises identifying when a pseudo-steady state maximum airflow and a pseudo-steady state maximum ESP have been achieved.

7. The method of claim 1, wherein the second active filter test further includes:
   determining a percentage increase in the second ESP value over the first baseline ESP value; and
   comparing the determined percentage increase with a predetermined maximum percentage increase.

8. The method of claim 1, further comprising:
   issuing an alert to a user of the climate control system to service the air filter in response to the determined condition of the air filter.

9. The method of claim 1, further comprising:
   measuring a speed and a torque of a motor of the indoor fan, wherein the first plurality of airflow values, and the first plurality of ESP values are estimated from the measured speed and the measured torque of the motor of the indoor fan.

10. The method of claim 1, further comprising:
conducting a third active filter test on the climate control system at a third time, the climate control system being installed at the given location and including the given air filter during the third active filter test, the third time being at least one week after the second time, the third active filter test including:
placing the climate control system in the idle mode,
setting the one or more dampers to the open position,
obtaining a third ESP value of the climate control system, and
comparing the third ESP value to the first baseline ESP value to determine a condition of an air filter of the climate control system.

11. A climate control system for an indoor space, the climate control system comprising:
an indoor fan configured to produce an airflow through the indoor space;
an air filter configured to filter contaminants in the airflow produced by the indoor fan;
one or more dampers configured to regulate the airflow to the indoor space;
a controller to be coupled to the indoor fan and the one or more dampers, wherein the controller is configured to:
conduct a first active filter test on the climate control system at a first time, the climate control system being installed at a given location and including the air filter during the first active filter test, the first active filter test including:
placing the climate control system in an idle mode, the idle mode including setting the climate control system to a fan only mode and setting an initial speed of an indoor fan of the climate control system,
setting the one or more dampers to an open position,
increasing, from idle, a speed of the indoor fan of the climate control system to increase the airflow through the indoor space,
determining a first fitted external static pressure (ESP) function from a first plurality of airflow values and a first plurality of ESP values, and
obtaining a first baseline ESP value of the climate control system from the first fitted ESP function;
conduct a second active filter test on the climate control system at a second time, the climate control system being installed at the given location and including the air filter during the second active filter test, the second time being at least one week after the first time, the second active filter test including:
placing the climate control system in the idle mode,
setting the one or more dampers to the open position,
obtaining a second ESP value of the climate control system; and
comparing the second ESP value to the first baseline ESP value to determine a condition of the air filter of the climate control system.

12. The climate control system of claim 11, wherein the controller is further configured to enter a selected airflow during the second active filter test, the selected airflow being normalized by a maximum airflow of the indoor fan, and wherein the second ESP value corresponds to the selected airflow.

13. The climate control system of claim 11, wherein the one or more dampers is a plurality of dampers, and setting the one or more dampers includes setting all of the plurality of dampers to the open position.

14. The climate control system of claim 11, wherein setting the initial speed of the indoor fan includes setting the initial speed of an indoor fan to zero.

15. The climate control system of claim 11, wherein the control configured to conduct the first active filter test is further configured to:
determine an airflow start value and an ESP start value at a first airflow rate; and
determine an airflow end value and an ESP end value at a second airflow rate which is greater than the first airflow rate.

16. The climate control system of claim 15, wherein the control configured to determine the airflow start value is further configured to determine the airflow start value by identifying a first non-zero airflow of the first plurality of airflow values.

17. The climate control system of claim 15, wherein the control configured to determine the airflow end value and the ESP end value is further configured to determine the airflow end value and the ESP end value at the second airflow rate by identifying when a pseudo-steady state maximum airflow and a pseudo-steady state maximum ESP have been achieved.

18. The climate control system of claim 11, wherein the controller is configured to determine a percentage increase in the second ESP value over the first baseline ESP value and compare the determined percentage increase with a predetermined maximum percentage increase.

19. The climate control system of claim 11, wherein the controller is configured to:
measure a speed and a torque of a motor of the indoor fan; and
estimate the first plurality of airflow values and the first plurality of ESP values from the measured speed and the measured torque of the motor of the indoor fan.

20. The climate control system of claim 11, wherein the controller is further configured to:
conduct a third active filter test on the climate control system at a third time, the climate control system being installed at the given location and including the given air filter during the third active filter test, the third time being at least one week after the second time, the third active filter test including:
placing the climate control system in the idle mode,
setting the one or more dampers to the open position,
obtaining a third ESP value of the climate control system; and
comparing the third ESP value to the first baseline ESP value to determine a condition of the air filter of the climate control system.

* * * * *